United States Patent
Wetchler et al.

(10) Patent No.: US 6,273,549 B1
(45) Date of Patent: *Aug. 14, 2001

(54) MULTIPLE PASS COLOR SHIFT CORRECTION TECHNIQUE FOR AN INKJET PRINTER

(75) Inventors: David M. Wetchler, Vancouver; Jason Quintana, Brush Prairie; James M. Brenner, Vancouver, all of WA (US)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/134,079

(22) Filed: Aug. 13, 1998

(51) Int. Cl.$^7$ .................................................. B41J 2/21
(52) U.S. Cl. .................. 347/43; 347/12; 347/41
(58) Field of Search .................. 347/41, 43, 12; 400/323

(56) References Cited

U.S. PATENT DOCUMENTS

| | | |
|---|---|---|
| 4,533,928 | 8/1985 | Sigiura et al. . |
| 4,963,882 * | 10/1990 | Hickman ................ 347/41 |
| 4,965,593 | 10/1990 | Hickman ................ 347/12 |
| 5,276,467 | 1/1994 | Meyer et al. ............. 347/19 |
| 5,376,958 | 12/1994 | Richtsmeier et al. ....... 347/40 |
| 5,555,006 | 9/1996 | Cleveland et al. ......... 347/41 |
| 5,594,478 | 1/1997 | Matsubara et al. ......... 347/41 |
| 5,604,520 | 2/1997 | Matsubara et al. ......... 347/43 |
| 5,633,663 * | 5/1997 | Matsubara et al. ......... 347/41 |
| 5,825,377 * | 10/1998 | Gotoh et al. ............ 347/43 X |
| 5,992,972 * | 11/1999 | Nagoshi et al. .......... 347/43 |
| 6,164,745 * | 12/2000 | Nagoshi et al. .......... 347/41 X |

FOREIGN PATENT DOCUMENTS

| | | | |
|---|---|---|---|
| 0564252A2 | 10/1993 | (EP) . | |
| 0671699A2 | 9/1995 | (EP) . | |
| 0722835A1 | 11/1995 | (EP) | ............... B41J/2/01 |
| 0694396A2 | 1/1996 | (EP) . | |
| 64-53853 * | 3/1989 | (JP) | ............... B41J/3/04 |
| 05124229 | 5/1993 | (JP) . | |

* cited by examiner

*Primary Examiner*—David F. Yockey

(57) ABSTRACT

In one embodiment of the present invention, for a two-pass print mode, instead of two or more color printheads depositing the same amount of ink for each pass, one of the passes (the primary pass) in a predetermined direction deposits a substantial majority of the ink, and other pass (the secondary pass) deposits the remainder of the ink. The primary pass for a particular composite color must always be in the same direction for minimizing color shift, at least when printing contiguous swaths of the same color. For minimizing color shift, the choice of a direction for the primary pass can be arbitrary, related to performance, or related to the order of the primary colors in the carriage. This majority ink pass will dominate the ink effects and cause color shifts to be less perceptible. The amount of ink per pass may be determined on an empirical basis. This technique of depositing more ink dots during a pass in a predetermined direction applies to any number of passes, but is particularly applicable to two-pass print modes.

18 Claims, 3 Drawing Sheets

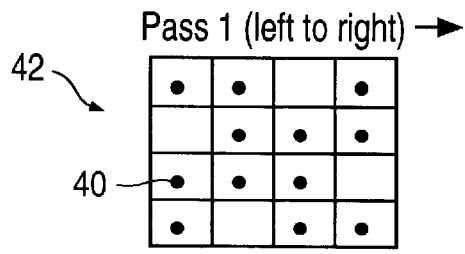
FIG. 3A
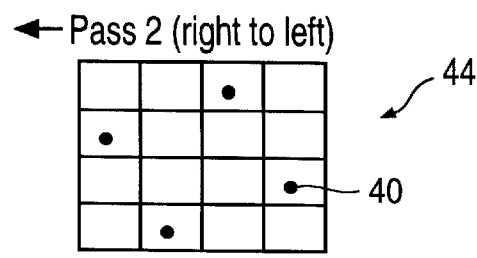
FIG. 3B
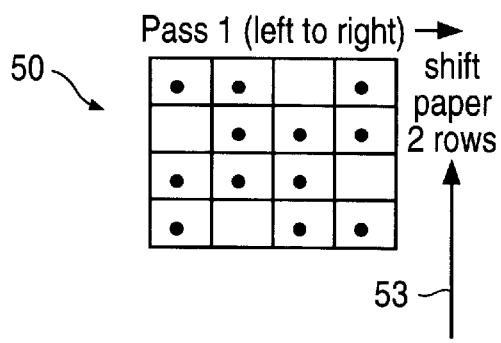
FIG. 4A
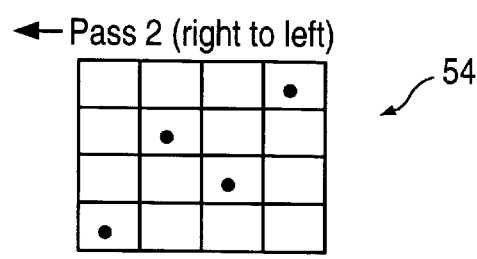
FIG. 4B
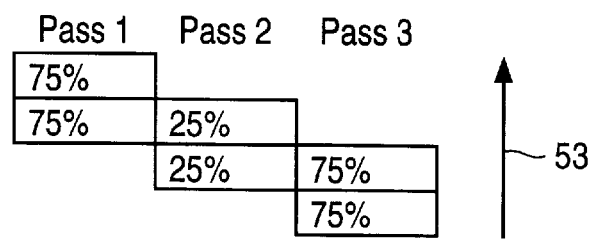
FIG. 4C
| Pass 1 | Pass 2 |
|---|---|
| 75% | 25% |
| 25% | 75% |
FIG. 5

MULTIPLE PASS COLOR SHIFT CORRECTION TECHNIQUE FOR AN INKJET PRINTER

FIELD OF THE INVENTION

This invention relates to inkjet printers and, in particular, to a technique for maintaining color consistency on a medium.

BACKGROUND

Color inkjet printers are well-known and generally incorporate multiple printheads in a scanning carriage which scans left to right and right to left across a medium while the printheads eject droplets of ink. The printheads are typically housed in one or more print cartridges either containing ink or having ink supplied to them from an external source. The ink is channeled to ink ejection chambers formed on a substrate associated with each printhead. Within each of the ink ejection chambers is an ink ejection element, such as a resistive heater or a piezoelectric element. A nozzle plate resides over each printhead such that each nozzle is aligned over an ink ejection chamber. Each printhead may have hundreds of nozzles for printing at 300 dots per inch or more. As energization signals are provided to the ink ejection elements as the printheads are scanned across the medium, ink droplets are ejected from the nozzles to create a pattern of ink dots to print text or an image. High quality printers typically print in both directions to increase throughput.

Color printers typically include a black printhead, a cyan printhead, a magenta printhead, and a yellow printhead aligned in the scanning carriage so that they scan over the same portion of a medium. Even though an image to be printed may ultimately require a full saturation primary color or a full saturation composite color, it is desirable not to print high density print swaths in a single pass. Such single pass printing is not desirable for many reasons. For example, a defective nozzle or ink ejection element would result in a white horizontal line across the medium. A single pass to deposit all the ink needed for the image may provide too much ink in too short of a time to be absorbed by the medium. This would result in excessive ink bleed, excessive drying times, and cockling (warping) of the medium. Also, a single pass may not be sufficient to provide the desired color saturation.

For at least these reasons, high quality printers use multiple passes, when appropriate, such that only a fraction of the total ink required for the image is deposited in a single pass, and any areas not covered by the first pass are filled by one or more later passes.

Since the arrangement of the color printheads in the scanning carriage is fixed (such as the order: black, cyan, magenta, and yellow as viewed from the front of the printer) and all three primary colors (and possibly black) will generally be printed during each pass for a full color image, yellow ink will always be deposited first going from left to right, and cyan ink will always be deposited first going from right to left. Even though a particular composite color requires a particular ratio of, for example, yellow and cyan, this composite color will appear differently depending upon whether cyan ink overlaps yellow ink or whether yellow ink overlaps cyan ink.

When printing using a multi-pass print mode in both directions, color shift results from two or more overlapping colors of ink being deposited on the medium in different orders. A color shift is any detectable difference in color, including becoming lighter or darker. Because the medium is typically stepped after each pass, color shift is generally apparent by horizontal bands which alternate from lighter to darker (or from one color to another color) due to the colors overlapping in different orders during sequential passes. Prior applications have used large numbers of passes to offset this color shift effect. For example, four or eight total passes, each pass depositing an equal amount of ink, causes the error to be dispersed and largely unnoticed. Multiple pass techniques in an inkjet printer have been described in the following U.S. patents assigned to the present assignee and incorporated herein by reference: U.S. Pat. Nos. 5,555,006; 5,376,958; 5,276,467; and 4,965,593. These patents are also cited for their description of masking particular nozzles during particular passes, referred to as print masking, and to illustrate that such print masking techniques are well-known and need not be described herein in detail.

Another defect from multiple passes in both directions results from bi-directional alignment errors of the carriage whereby dots in one pass intending to overlap dots from a previous pass do not precisely overlap those dots.

What is needed, is a multi-pass technique that mitigates the above-described drawbacks.

SUMMARY

In one embodiment of the present invention, for a two-pass print mode, instead of two or more color (including black) printheads depositing the same amount of ink for each pass, one of the passes (the primary pass) in a predetermined direction deposits a majority of the ink, and other pass (the secondary pass) deposits the remainder of the ink. The primary pass direction may be selected so that the particular order of color inks deposited in the primary pass direction is more desirable than the order of color inks deposited in the secondary pass direction. Hence, the primary pass direction will be fixed for a particular composite color, at least when printing contiguous swaths of the same color. As an example, the left-to-right pass for a particular composite color deposits 60% or more of the ink dots, and the right-to-left pass deposits the remainder of the ink dots.

This technique of depositing more ink dots during a pass in a predetermined direction applies to any number of passes, but is particularly applicable to two-pass print modes.

The majority of the ink should be deposited always in the same direction for minimizing color shift. For minimizing color shift, the choice of a direction can be arbitrary, related to performance, or related to the order of the printheads in the carriage. This majority ink pass will dominate the ink effects and cause color shifts to be less perceptible. The amount of ink per pass may be determined on an empirical basis. Since for a gray scale image portion, or other image portion only using a single primary color, there will not be a color shift, such a non-composite color may still use the more optimal 50% ink per pass. Each color of ink may have a different percentage deposited in each pass based on what is optimal for minimizing color shift.

This technique also works for multi-drop systems where each pixel may consist of multiple drops of the same color ink overlapping one another.

In a preferred embodiment, the medium is incrementally stepped in a direction perpendicular to the direction of scanning by a distance equal to a fraction of the height of a printhead. Thus, the medium will be shifted between each pass, and a portion of the printheads will overlap a printed swath from a prior scan.

BRIEF DESCRIPTION OF THE DRAWINGS

FIGS. 3A and 3B illustrate one technique in accordance with the present invention for reducing color shift.

FIGS. 4A–4C illustrate another technique in accordance with the present invention for reducing color shift.

FIG. 5 illustrates yet another technique in accordance with the present invention.

DETAILED DESCRIPTION OF THE EMBODIMENTS

Figure 1:
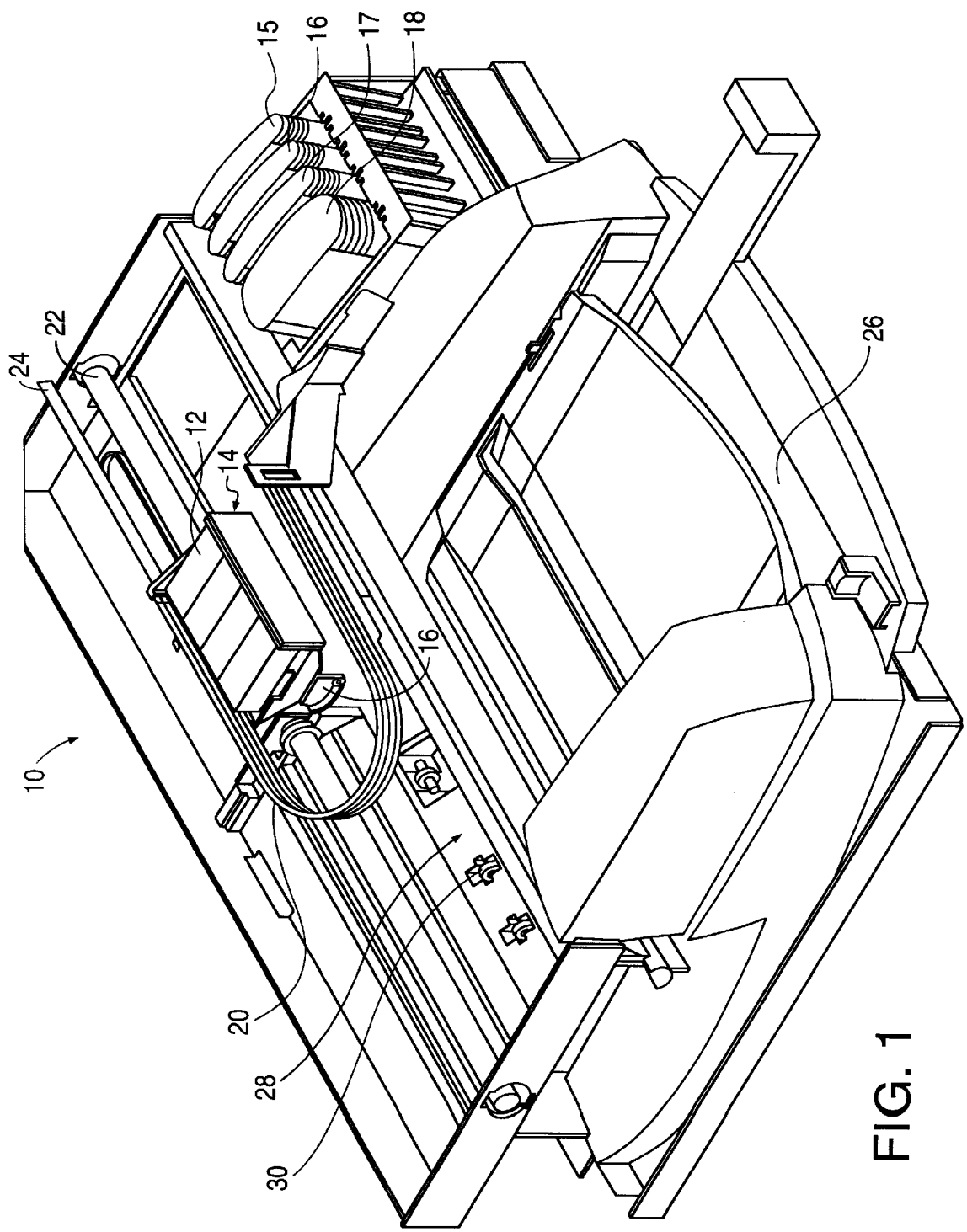
FIG. 1. illustrates one embodiment of a printer incorporating the technique of the present invention.

FIG. 1 illustrates one type of printer 10 which incorporates the present invention for reducing color shift using multiple passes of printheads over the same area of a medium. The most common type of medium to be printed upon is paper, including standard copy paper and glossy paper. Any inkjet printer may incorporate the present invention, and FIG. 1 is simply to provide an example of one type of printer.

Print cartridges 12, each including a printhead, are mounted in a scanning carriage 14, which scans from left to right or right to left while energizing signals are applied to the printheads to print dots along the medium. Ink supplies 15–18 provide a different color ink to each print cartridge via tubes 20. Alternatively, each print cartridge 12 contains a substantial reservoir of ink, and ink supplies 15–18 are eliminated.

Carriage 14 slides along a slide rod 22 via a well-known belt and pulley system, and a coded strip 24 is electronically read by an optical detector on carriage 14 to identify the horizontal pixel position of carriage 14.

A supply tray contains sheets of paper 26 which are fed one by one into a print zone 28 of printer 10 and incrementally shifted through the print zone 28 in a direction perpendicular to the scanning of the carriage 14 by frictional rollers 30 under the control of a stepper motor. The conventional operation of printer 10 need not be described herein for a complete understanding of the present invention.

Figure 2:
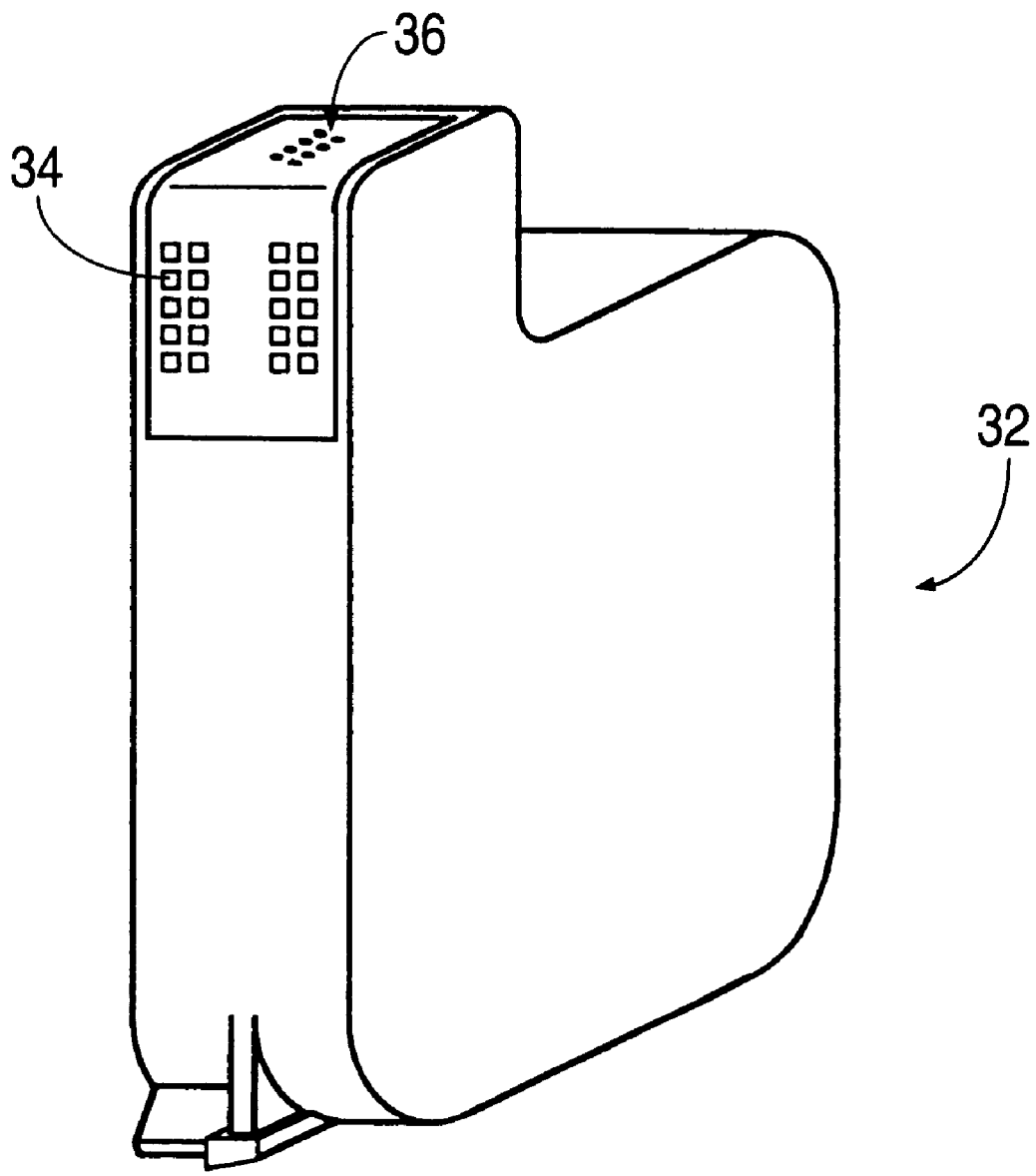
FIG. 2 illustrates one type of print cartridge which can be installed in an inkjet printer and controlled to carry out the present invention.

FIG. 2 illustrates one type of print cartridge 32, which may include an ink inlet (not shown) connected to one of the flexible tubes 20 in FIG. 1 or, alternatively, may be a disposable type containing a single supply of ink. Contact pads 34 contact electrodes in carriage 14 which provide ink ejection energization signals controlled by processing equipment internal to printer 10. Selectively applying signals to contact pads 34 causes droplets of ink to be ejected from nozzles 36 as the print cartridge 32 scans along the medium. FIG. 2 is a simplification of a print cartridge, and print cartridge 32 may contain a printhead having many hundreds of ink ejection elements and nozzles.

A further description of printers and print cartridges may be obtained from U.S. Pat. No. 5,852,459, entitled Printer Using Print Cartridge with Internal Pressure Regulator, by Norman Pawlowski, et al.; U.S. Pat. No. 5,278,582, entitled Ink Delivery System for an Inkjet Printhead, by Brian Keefe, et al.; and U.S. Pat. No. 5,408,746, entitled Datum Formation for Improved Alignment of Multiple Nozzle Members in a Printer, by Jeffrey Thoman et al., all assigned to the present assignee and incorporated herein by reference.

The present invention reduces the effects of color shift due to multiple passes in opposite directions depositing overlapping color dots on a medium. Instead of depositing an equal amount of ink in each pass for a particular composite color, as previously described, the present technique deposits the largest quantity of ink (i.e., the most dots) in one primary pass, the primary pass for that particular composite color always being in the same direction.

As an example, if a desired final color to be printed on the medium was a certain combination of yellow and cyan ink, it may have been empirically determined that the desired color is precisely obtained by first depositing a certain density of yellow dots followed by a certain density of overlapping cyan dots. The desired color would not be precisely achieved by first depositing cyan dots followed by overlapping yellow dots. Assume the order of color print cartridges in a printer, when viewing from the front of the printer, is cyan, magenta, and yellow. A printing pass from left to right, while printing dots from the cyan and yellow print cartridges to achieve the desired color image, would necessarily first print yellow dots during the pass followed by cyan dots in the same pass as the cyan printhead passes over the yellow dots just printed. This is the desired order of overlapping dots. For increased throughput and reasons previously mentioned, it is desired to print certain composite colors in multiple passes and in both directions. However, the composite color printed from right to left produces a color that is slightly different from the color printed during the left-to-right pass. By depositing a larger percentage of the total ink required to produce the desired color during the left-to-right pass, when yellow is printed just prior to the cyan color, the color shift is reduced. However, there is a tradeoff between the detrimental effect of depositing too much ink in one pass and the reduction of color shift.

FIGS. 3A and 3B illustrate a two-pass process in which 75% of the ink is deposited during the first pass and 25% of the ink is deposited during the second pass. The choice of the direction in which the majority of the ink is deposited (primary pass) is preferably selected based upon the best color reproduction. However, for simply minimizing color shift, as opposed to obtaining the color which most closely matches the desired color, the choice of direction for the primary pass can be arbitrary, but must always be in the same direction for the particular composite color.

FIGS. 3A and 3B represent print masks 42 and 44 for a 4×4 nozzle printhead, where a dot 40 represents that the pixel information to a corresponding ink ejection element in the printhead is not blocked and the absence of a dot represents that the pixel information to a corresponding ink ejection element is blocked. For a larger array, the print masks 42 and 44 may simply be tiled for the entire printhead array.

The print masks 42 and 44 are applied to two or more color printheads for each of the two passes. The color combinations are not relevant for the explanation. For FIG. 3A, it has been selected by the printer manufacturer that the primary pass is to be from left to right. In the primary pass, print mask 42 is used, and 75% of the ink required for the final color is deposited from left to right. In the secondary pass, print mask 44 is used, and the remaining 25% of the ink is deposited from right to left to complete the composite color. Thus, the resulting composite color printed on the medium will be primarily represented by the color deposited during the primary pass.

For subsequent passes, as the image is printed down the length of the paper, there will be imperceptible color shift between each swath across the medium.

FIGS. 3A and 3B represent a generic implementation of the invention where the medium may be shifted between passes or held stationary between the two passes.

FIGS. 4A, 4B and 4C illustrate the implementation of this inventive concept for a 4×4 nozzle printhead while the medium is shifted an incremental amount between passes, the amount being a fraction of the height of a single printhead.

FIG. 4A represents a print mask 50 for the primary pass from left to right, printing 75% of the ink for the resulting composite color. When the carriage has reached the right side of the paper, the paper is shifted by two vertical pixel rows (one half the height of the printhead) in the direction of arrow 53, and the print mask 54 of FIG. 4B is then used from right to left to fill in the remaining 25% of the pixels not printed during the primary pass.

FIG. 4C illustrates the interaction of the passes with the shifting of the paper in the direction shown by arrow 53. The print mask used in pass 3 is identical to the print mask used in pass 1.

FIG. 5 illustrates the use of a print mask that allows 75% of the ink ejection elements in the top half of a printhead to print while allowing 25% of the ink ejection elements in the bottom half to print. The print mask is flipped for the secondary pass to complete the composite color.

Although the invention primarily improves color printing which has, in the past, used a two-pass print mode with 50% of the ink printed in each pass, this invention will also improve other multiple pass print modes (e.g., 3 or more passes) by printing more of the ink for the composite color always in the same direction to achieve the results previously described.

This invention may be implemented by slightly modifying the well-known prior art print masking techniques that mask 50% of the nozzles in one pass and the other 50% in the next pass. Print masks are well-known and described in the various Hewlett-Packard patents mentioned earlier. Other print mask techniques are described in U.S. Pat. Nos. 5,604,520 and 5,594,478, incorporated herein by reference.

Generally, in the final stages of processing print commands, pixel information to be transmitted to the printheads is stored in a buffer. This buffer may be a swath buffer which, in some embodiments, has the pixel information bit-mapped to the pixel locations across the medium. There may be multiple swath buffers, depending upon how much information is required. A print mask may conceptionally be understood as electronic gates, or a particular addressing sequence, which selects from the swath buffer(s) which pixel data is to be transmitted to the printheads during a single scan. One skilled in the art can easily implement this invention.

Certain high quality printers may overlap dots of the same color to increase the color saturation. For example, one, two, three, four, or more drops of the same color ink may be deposited in the same pixel location. The above-described multi-pass technique may be applied to this type of multi-drop system by determining the number of drops per pixel to be deposited in each pass, rather than simply blocking pixel information from the printheads. For example, if a particular color requires three drops of yellow deposited in each pixel along a swath followed by three drops of cyan deposited on top of the yellow, two drops of yellow and cyan may be deposited in the primary pass while one drop of yellow and cyan may be deposited in the secondary pass. If only one drop of a printhead color per pixel is needed for the final color, all these dots may then be deposited in the first pass. The only restriction is that the primary pass deposit more ink than any secondary pass.

In certain situations, it may be appropriate that the primary pass (e.g., left to right) is the second pass over the same area of a medium, so as to have no adverse effect on throughput.

Thus, a technique for reducing color shift has been described that may be applied to any degree depending upon the best results, which may be determined empirically. For example, the primary pass (for a two-pass mode) may consist of 55%, 66%, 75%, or more of the total ink to be deposited. For printing an image portion of black or other primary color (i.e., not a composite color), color shift is not a concern, and the more optimum 50% per pass may be used. Shading of colors may require combining black with other colors, and the inventive technique is also applicable to such composite colors.

Each system will need the correct balance to maximize color shift correction and minimize other errors. Ink/dye effects and print cartridge ordering can affect this choice. Each type of ink may have different optimum percentages for the primary pass.

While particular embodiments of the present inventions have been shown and described, it will be obvious to those skilled in the art that changes and modifications may be made without departing from this invention in its broader aspects and, therefore, the appended claims are to encompass within their scope all such changes and modifications as fall with the true spirit and scope of this invention.

What is claimed is:

1. A method for printing color ink comprising:

providing a medium to be printed upon in a print zone of an inkjet printer;

determining a composite color to be printed on said medium;

scanning at least a first printhead having an array of ink ejection elements, printing a first color, and a second printhead having an array of ink ejection elements, printing a second color, across said print zone;

energizing said ink ejection elements in at least said first printhead and said second printhead, to print said first color and said second color, as said first printhead and said second printhead scan across said print zone in a primary pass so that a first quantity of ink is deposited on said medium during said primary pass, said primary pass being in a predetermined first direction across said print zone for said composite color; and energizing said ink ejection elements in at least said first printhead and said second printhead, to print said first color and said second color, as said first printhead and said second printhead scan across said print zone in a secondary pass so that a second quantity of ink, less than said first quantity of ink, is deposited on said medium during said secondary pass, said secondary pass being in a second direction across said print zone opposite to said first direction, at least a portion of said first quantity of ink and said second quantity of ink overlapping to produce said composite color, wherein said first direction is always selected for said primary pass for said composite color to reduce a color shift effect, and wherein said first direction is based on an optimal order of said first color and said second color being deposited for creating said composite color.

2. The method of claim 1 wherein said primary pass and said secondary pass complete printing of said composite color.

3. The method of claim 1 wherein said primary pass and said secondary pass partially complete printing of said composite color, and at least one additional pass is needed to complete said composite color, said additional pass depositing a quantity of ink less than said first quantity.

4. The method of claim 1 further comprising shifting said medium in a direction perpendicular to a direction of said scanning after each scan of said printheads across said medium.

5. The method of claim 1 wherein said first printhead and said second printhead each print a color from the group consisting of black, cyan, magenta, and yellow.

6. The method of claim 1 wherein said method is a two pass print mode, and said primary pass prints 55% or more of the ink required to complete said composite color.

7. The method of claim 1 wherein said method is a two pass print mode, and said primary pass prints 66% or more of the ink required to complete said composite color.

8. The method of claim 1 wherein said method is a two pass print mode, and said primary pass prints 75% or more of the ink required to complete said composite color.

9. The method of claim 1 wherein said step of scanning comprises scanning multiple print cartridges across said medium.

10. The method of claim 1 wherein said primary pass occurs before said secondary pass.

11. The method of claim 1 wherein said step of energizing ink ejection elements comprises energizing heater resistors.

12. The method of claim 1 wherein said step of energizing ink ejection elements comprises energizing piezoelectric elements.

13. The method of claim 1 further comprising scanning a third printhead, printing a third color, said third printhead also ejecting drops of ink during said primary pass in a creation of said composite color.

14. The method of claim 1 wherein ink dots of a same color are overlapped by said primary pass and said secondary pass.

15. The method of claim 1 further comprising energizing ink ejection elements in said first printhead and said second printhead during additional passes to fully create said composite color.

16. The method of claim 1 wherein said step of energizing ink ejection elements in said primary pass comprises applying a first print mask to pixel information to be applied to said first printhead and said second printhead, and wherein said step of energizing ink ejection elements in said secondary pass comprises applying a second print mask to pixel information to be applied to said first printhead and second printhead.

17. The method of claim 1 wherein said primary pass occurs before said secondary pass.

18. The method of claim 1 wherein said primary pass occurs after said secondary pass.

* * * * *